July 17, 1934.  T. T. GARRISON  1,966,795
THRUST BEARING
Filed Feb. 23, 1933

INVENTOR
T. T. GARRISON
By
Hazard & Miller
ATTORNEYS

Patented July 17, 1934

1,966,795

UNITED STATES PATENT OFFICE 1,966,795

THRUST BEARING

Thomas T. Garrison, Los Angeles, Calif.

Application February 23, 1933, Serial No. 657,979

4 Claims. (Cl. 308—135)

This invention relates to improvements in thrust bearings.

An object of the invention is to provide an improved thrust bearing of extremely cheap, simple and durable construction, which will satisfactorily take care of all reasonable loads which may be imposed on the bearing and which makes adequate provision for supplying lubricant between the bearing surfaces of the bearing.

More specifically an object of the invention is to provide a cheap, simple and durable thrust bearing for use on automobiles between the ears in the spindle and the knuckle at the end of the front axle.

The improved bearing is so designed as to be capable of being easily installed and of being easily supplied with adequate lubricant so as to enable turning of the spindle quite readily at all times.

With the foregoing and other objects in view, which will be made manifest in the following detailed description, and specifically pointed out in the appended claims, reference is had to the accompanying drawing for an illustrative embodiment of the invention, wherein:

Figure 1:
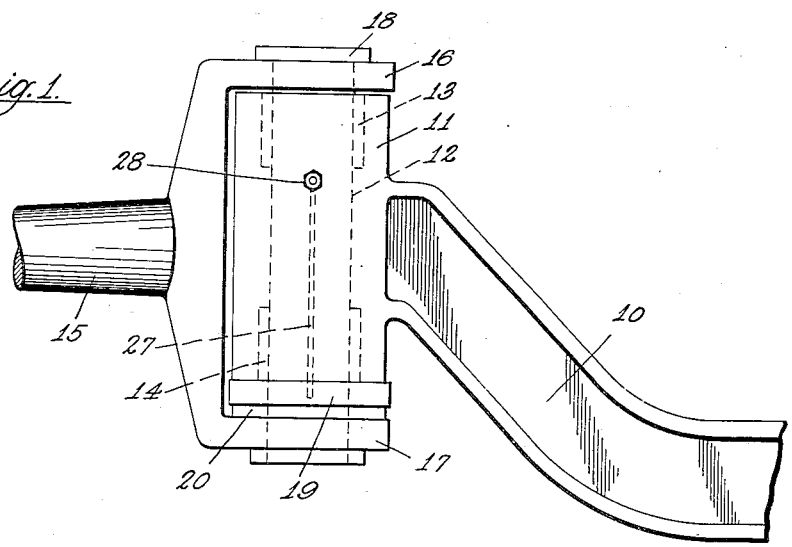
Fig. 1 is a partial view in side elevation illustrating the end of an automobile axle and the improved thrust bearing in applied position.
Figure 2:
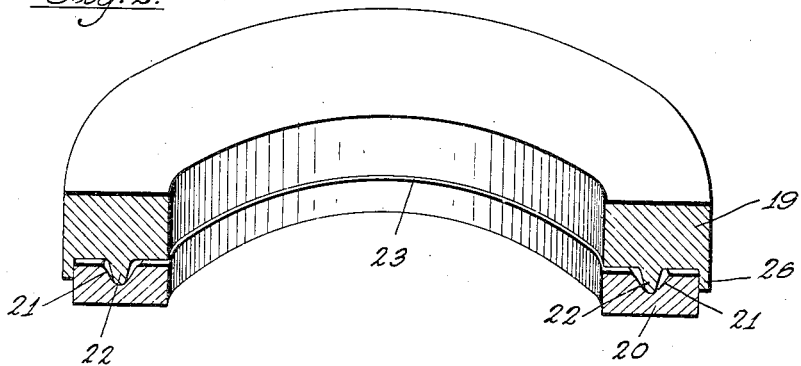
Fig. 2 is a vertical section through the improved thrust bearing.
Figure 3:
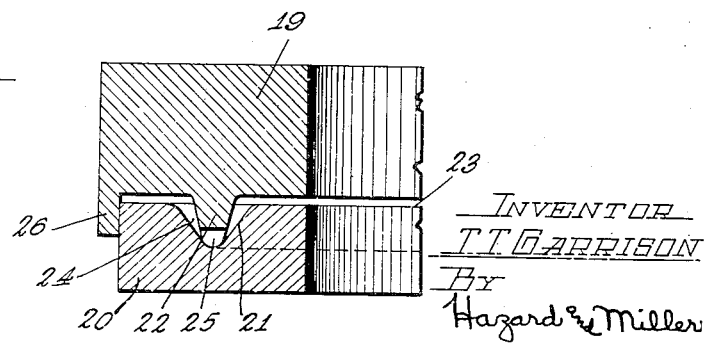
Fig. 3 is a partial view in vertical section illustrating a detail of construction.

Referring to the accompanying drawing, wherein similar reference characters designate similar parts throughout, the improved thrust bearing is illustrated as having been applied to the front axle of an automobile, although it will be appreciated that it may be used under any circumstances where a cheap, simple and durable thrust bearing may be desired. The axle is indicated by the reference character 10, having a knuckle 11 provided with a vertical bore 12 therethrough, which may be aligned with upper and lower bushings 13 and 14 in accordance with conventional construction. The spindle 15 has upper and lower ears 16 and 17 and the king pin 18 extends through the ears, through the bushings and through the bore. The thrust bearing is interposed between the bottom of the knuckle 11 and bottom ear 17. It consists of two annular metal members, the upper of which is indicated at 19 and the lower of which is indicated at 20. These may be formed of any suitable metal and may be suitably hardened. On the upper surface of the lower member 20 there is formed a groove 21 into which extends an annular rib or bead 22. The bottom of the rib or bead 22 is rounded and the bottom of the groove 21 is also rounded. The curvatures of the rounded bottom of the bead and the rounded bottom of the groove are slightly different so that there is a very narrow surface of engagement between the bottom of the rib and the bottom of the groove. This surface of engagement approaches being merely a line of contact between the bead and the groove. This rib or bead 22 and groove 21 are so designed as to keep the opposed faces of members 19 and 20 slightly spaced from each other as indicated at 23. As will be noted from a close inspection of Figures 2 and 3, the side walls of groove 21 are spaced considerably from the sides of rib 22, forming an adequate clearance 24. On diametrically opposite sides of rib 22 there may be formed small notches or transversely extending passages 25 which establish communication between the clearance on one side of rib 22 with the clearance on the other side of rib 22. One of the members, preferably the upper member 19, has an integral lip or flange 26 extending downwardly over the other member 20. This lip or flange fits snugly around member 20. An oil gland or groove, as indicated at 27, extends downwardly along king pin 18. Its lower end terminates adjacent the space or clearance 23. It may be supplied with lubricant in any suitable manner, such as by a lubricant fitting 28.

The operation and advantages of the improved thrust bearing are as follows. The load imposed upon axle 10 is transmitted through the upper part 19, the bottom of its rib or bead 20, to the bottom surface of groove 21 and to the bottom member 20, which in turn transmits it to the spindle 15 on which the wheel is mounted. Lubricant is supplied through the lubricant fitting 28 and is discharged into the space at 23, entering the clearance indicated at 24 adjacent the inner side of rib 22. It flows through the transverse passages at 25 and in this way the wide groove 21 is filled with lubricant so that there is a complete bath of lubricant in which the bead or rib 22 is submerged at all times. The close fitting lip or flange 26 tends to confine the lubricant between the members 19 and 20, although excess lubricant may work out between lip or flange 26 and the outer side of lower member 20. It will be appreciated that by having a space between the sides of the groove and the sides of the rib or bead 22, that a reservoir of lubricant is maintained at all times adjacent the rib, thus assuring lubrication of the engaging surfaces between the bottom of the rib and the bottom of the groove. This readily available supply of lubricant assures easy turning of the members 19 and 20 relatively to each other at all times, facilitating the turning of the spindle as is required in the steering of the automobile.

From the above described construction it will be appreciated that an improved thrust bearing is provided, which is of very simple, cheap and durable construction, and which makes it possible to keep the parts thoroughly lubricated. The distributed bearing is highly advantageous over ball or roller bearings in that vibration or impacts tend to cause balls or rollers to pit or deform their respective races. In addition, the improved bearing is of much cheaper construction than an equivalent ball bearing.

It is obvious that under various conditions the number of ribs and grooves may be increased. For example, where the thrust bearing is subjected to a very heavy load two or three or more ribs may be formed on the under surface of the upper part of the thrust bearing and corresponding grooves may be formed on the lower member of the thrust bearing.

Various changes may be made in the details of construction without departing from the spirit or scope of the invention as defined by the appended claims.

I claim:

1. A thrust bearing comprising an upper annular member and a lower annular member, said upper annular member having a circular rib on its under side the bottom of which is rounded so as to present at its bottom a narrow surface for contact with the lower annular member, the lower annular member having a circular groove in its upper surface the bottom of which is rounded on which the bottom of the rib rests, the sides of the groove being spaced from the sides of the rib so as to afford a clearance on both sides of the rib so that a bath of lubricant can be maintained on both sides of the line of engagement between the annular members.

2. A thrust bearing comprising an upper annular member and a lower annular member, the upper annular member having a circular rib on its under side the inner and outer sides of which taper downwardly, the bottom of the rib being rounded so as to present at its bottom a narrow surface in contact with the lower annular member, the lower annular member having a circular groove in its upper surface the sides of which converge downwardly and the bottom of which is rounded on which the bottom of the rib rests, the sides of the groove being inclined in such a manner as to be spaced from the sides of the rib so that a bath of lubricant can be maintained on both sides of the line of the engagement between the annular members.

3. A thrust bearing comprising an upper annular member and a lower annular member, the upper annular member having a circular rib on its under side the inner and outer sides of which taper downwardly, the bottom of the rib being rounded so as to present at its bottom a narrow surface in contact with the lower annular member, the lower annular member having a circular groove in its upper surface the sides of which converge downwardly and the bottom of which is rounded on which the bottom of the rib rests, the sides of the groove being inclined in such a manner as to be spaced from the sides of the rib so that a bath of lubricant can be maintained on both sides of the line of the engagement between the annular members, said ribs having transverse passages therethrough enabling communication between one clearance space on one side of the rib with the clearance space on the other side of the rib, the upper annular member having a downwardly extending flange fitting closely about the lower annular member so as to confine the lubricant between the members.

4. A thrust bearing comprising an upper annular member and a lower annular member, the upper annular member having a circular rib on its under side the inner and outer sides of which taper downwardly, the bottom of the rib being rounded so as to present at its bottom a narrow surface in contact with the lower annular member, the lower annular member having a circular groove in its upper surface the sides of which converge downwardly and the bottom of which is rounded on which the bottom of the rib rests, the sides of the groove being inclined in such a manner as to be spaced from the sides of the rib so that a bath of lubricant can be maintained on both sides of the line of the engagement between the annular members, said rib having transverse passages formed on its bottom enabling communication between one clearance space and the other.

THOMAS T. GARRISON.